US007006851B2

(12) United States Patent
Holmes et al.

(10) Patent No.: US 7,006,851 B2
(45) **Date of Patent: *Feb. 28, 2006**

(54) METHOD AND APPARATUS FOR PROVIDING POWER AND WIRELESS PROTOCOL CAPABILITY TO A WIRELESS DEVICE, SUCH AS A WIRELESS PHONE

(75) Inventors: David William James Holmes, Sammamish, WA (US); Thomas Edwin East Nelson, Sammamish, WA (US)

(73) Assignee: Cingular Wireless, II, LLC, Atlanta, GA (US)

(*) Notice: Subject to any disclaimer, the term of this patent is extended or adjusted under 35 U.S.C. 154(b) by 104 days.

This patent is subject to a terminal disclaimer.

(21) Appl. No.: 10/630,646

(22) Filed: Jul. 29, 2003

(65) Prior Publication Data

US 2005/0176369 A1 Aug. 11, 2005

Related U.S. Application Data

(63) Continuation of application No. 10/036,188, filed on Dec. 31, 2001, now Pat. No. 6,636,749.

(60) Provisional application No. 60/300,842, filed on Jun. 25, 2001.

(51) Int. Cl.
*H04M 1/00* (2006.01)

(52) U.S. Cl. .................. 455/569.2; 455/41.2; 455/572

(58) Field of Classification Search ............ 455/569.2, 455/569.1, 556.1, 557, 550.1, 575.1, 90.3, 455/41.2, 41.3, 575.9, 572, 573
See application file for complete search history.

(56) References Cited

U.S. PATENT DOCUMENTS

| | | | |
|---|---|---|---|
| 5,479,479 | A | 12/1995 | Braitberg et al. |
| 5,535,274 | A | 7/1996 | Braitberg et al. |
| 5,546,458 | A | 8/1996 | Iwami |
| 5,590,414 | A | 12/1996 | Marui et al. |
| 5,653,336 | A | 8/1997 | Buonaiuto et al. |
| 5,857,013 | A | 1/1999 | Yue et al. |

(Continued)

FOREIGN PATENT DOCUMENTS

EP 0 920 170 A2 6/1999

(Continued)

OTHER PUBLICATIONS

Krebs, Michelle, "Digital Link for Car Talk,", From Escapes/Bells and Whistles, Sep. 6, 2002, p. 1, The New York Times Website, Automobiles.

*Primary Examiner*—Nick Corsaro
*Assistant Examiner*—Lewis West
(74) *Attorney, Agent, or Firm*—Perkins Coie LLP

(57) ABSTRACT

Disclosed embodiments include a apparatus for coupling with a vehicle having a wireless protocol-enabled device, such as a hands-free car kit, and a power supply and for coupling with a wireless device. The wireless protocol may be a protocol such as Bluetooth, and the wireless device may be a wireless phone. The apparatus comprises a charge cord, a vehicle adapter located at a first end of the charge cord, and a connector located at a second end of a charge cord. The vehicle adapter couples the power supply to the charge cord, and the connector couples the charge cord with the wireless device. The apparatus also comprises a wireless protocol module operably connected to the charge cord, wherein the module comprises logic to exchange communications signals between the wireless protocol-enabled device and the wireless device.

14 Claims, 6 Drawing Sheets

U.S. PATENT DOCUMENTS

| | | | | |
|---|---|---|---|---|
| 6,052,603 | A * | 4/2000 | Kinzalow et al. | 455/557 |
| 6,058,319 | A | 5/2000 | Sadler | |
| 6,075,999 | A | 6/2000 | Vilmi et al. | |
| 6,078,825 | A | 6/2000 | Hahn et al. | |
| 6,101,403 | A | 8/2000 | Masuda | |
| 6,131,042 | A | 10/2000 | Lee et al. | |
| 6,138,041 | A | 10/2000 | Yahia | |
| 6,154,663 | A | 11/2000 | Itamochi | |
| 6,163,690 | A | 12/2000 | Lilja | |
| 6,163,711 | A | 12/2000 | Juntunen et al. | |
| 6,173,056 | B1 | 1/2001 | Romesburg et al. | |
| 6,184,651 | B1 | 2/2001 | Fernandez et al. | |
| 6,195,572 | B1 | 2/2001 | Patterson et al. | |
| 6,217,351 | B1 | 4/2001 | Fung et al. | |
| 6,230,029 | B1 | 5/2001 | Hahn et al. | |
| 6,246,211 | B1 | 6/2001 | Dalton et al. | |
| 6,255,800 | B1 | 7/2001 | Bork | |
| 6,266,544 | B1 | 7/2001 | Tomura et al. | |
| 6,304,764 | B1 * | 10/2001 | Pan | 455/569.2 |
| 6,339,696 | B1 | 1/2002 | Chan et al. | |
| 6,341,218 | B1 | 1/2002 | Poplawsky et al. | |
| 6,349,223 | B1 | 2/2002 | Chen | |
| 6,377,825 | B1 | 4/2002 | Kennedy et al. | |
| 6,397,086 | B1 | 5/2002 | Chen | |
| 6,459,882 | B1 | 10/2002 | Palermo et al. | |
| 6,636,749 | B1 * | 10/2003 | Holmes et al. | 455/569.2 |
| 6,687,517 | B1 | 2/2004 | Kinnunen | |
| 6,697,638 | B1 * | 2/2004 | Larsson et al. | 455/553.1 |
| 2001/0049262 | A1 | 12/2001 | Lehtonen | |
| 2002/0032042 | A1 | 3/2002 | Poplawsky et al. | |
| 2002/0197911 | A1 | 12/2002 | Holmes et al. | |
| 2002/0197954 | A1 | 12/2002 | Schmitt et al. | |
| 2003/0063717 | A1 | 4/2003 | Holmes et al. | |

FOREIGN PATENT DOCUMENTS

| | | |
|---|---|---|
| EP | 1 107 546 | 6/2001 |
| WO | WO99/45687 | 9/1999 |
| WO | WO99/45691 | 9/1999 |

* cited by examiner

METHOD AND APPARATUS FOR PROVIDING POWER AND WIRELESS PROTOCOL CAPABILITY TO A WIRELESS DEVICE, SUCH AS A WIRELESS PHONE

CROSS-REFERENCE TO RELATED APPLICATION(S)

This application is a continuation of U.S. patent application Ser. No. 10/036,188 filed on Dec. 31, 2001 now U.S. Pat. No. 6,636,749 and claims the benefit of U.S. Provisional Patent Application No. 60/300,842, filed Jun. 25, 2001, both of which are is herein incorporated by reference.

BACKGROUND

The disclosed embodiments relate generally to devices to connect wireless devices with vehicles.

Cellular mobile telephony, or wireless telephony, provides voice data links between users of mobile devices and fixed devices on a network. It gives users using a wireless phone mobility without regard to how they are actually connected to the network. This is done by providing access points or base station units that can hand off the connections of mobile devices without interruption of the service. 2G (second generation) digital mobile phone service such as the Global System for Mobile Communications (GSM), EIA/TIA-136 Time Division Multiple Access (TDMA), TIA-IS-95 Code Division Multiple Access (CDMA), and the AMPS (analog mobile phone service) are examples of such telephone networks.

In order to participate in wireless telephony more easily while driving, many drivers have endured considerable expense in terms of time, money, and effort to have a hands-free car kit professionally installed in their vehicles. The primary advantage to the hands-free car kit is that the user can carry on a conversation without having to hold a wireless phone to their ear. This frees up the hand that otherwise would have been holding the phone to perform other tasks, such as driving the car. The hands-free car kit may even provide other advantages such as superior reception and sound quality as compared to the wireless phone alone, since the hands-free car kit takes advantage of the vehicle's pre-existing audio or stereo system, speakers, and possibly an antenna. Another advantage is that users in a vehicle also often connect their wireless phone to the vehicle power supply in order to conserve battery power and possibly to recharge the battery.

In a typical usage scenario for a hands-free car kit, the user dials a phone number on their wireless phone to place a call or receives a call from another user. The user places the wireless phone into a special cradle which has been customized for physically holding that handset and for providing electrical connections to a microphone, speakers and possibly an antenna, as may be associated with the hands-free car kit. In many cases, the cradle and related electrical connections are adapted to only one phone model or a small number of closely related phones. The very limited number of phones that a hands-free car kit can work with becomes a problem when the user desires to change to a new or different wireless phone. The user may want to change their phone because the new phone offers better features, is associated with a different wireless service provider desired by the user or for any other reason. Newer phones have historically been smaller and differently shaped than existing phones, again giving rise to incompatibility with previously installed hands-free car kits. Other concurrently offered wireless phones tend to have different physical and electrical characteristics.

If the user purchases a wireless phone that is incompatible with a previously installed hands-free car kit, the car kit can be replaced with a newer or different hands-free car kit associated with the replacement phone. Unfortunately, replacement of the existing hands-free car kit would involve considerable expense in terms of time, money and effort, not only to install the replacement hands-free car kit, but to remove the existing hands-free car kit.

One solution to connecting a hands-free car kit and a mobile handset is to use a wireless networking technology or protocol, such as the short range wireless protocol BLUETOOTH® (referred to herein as "Bluetooth"), to facilitate communication between the hands-free car kit and the mobile handset. In this solution, a Bluetooth-enabled hands-free car kit and a Bluetooth-enabled wireless phone communicate via a wireless connection so that the wireless phone can utilize the hands-free car kit without a physical connection.

Bluetooth refers to a specification designed to standardize wireless transmission between a wide variety of devices, such as personal computers (PCs), cordless telephones, headsets, printers, personal digital assistants (PDAs), etc. Bluetooth, however, has not yet been widely adopted by manufacturers.

Almost all of the hands-free car kits and wireless phones on the market today do not include Bluetooth capability. Automobile manufacturers and hands-free car kit manufacturers have not included Bluetooth functionality in their products, perhaps because Bluetooth-enabled wireless phones have not been widely adopted. Bluetooth-enabled wireless phones have not been widely adopted, possibly because of the additional expense or the dearth of applications available for them (e.g., few hands-free car kits with Bluetooth functionality). In addition, Bluetooth retrofitting, such as by adding a clip-on module or dongle to a wireless phone, adds significant expense, bulkiness, and weight to a wireless phone. It would be desirable to be able to provide Bluetooth capability to wireless phones without requiring a separate module or dongle, with its associated expense and size, to existing wireless phones.

Overall, there is a need for a method and apparatus that solves the above problems while supplying the above benefits, as well as providing other advantages.

Figure 1:
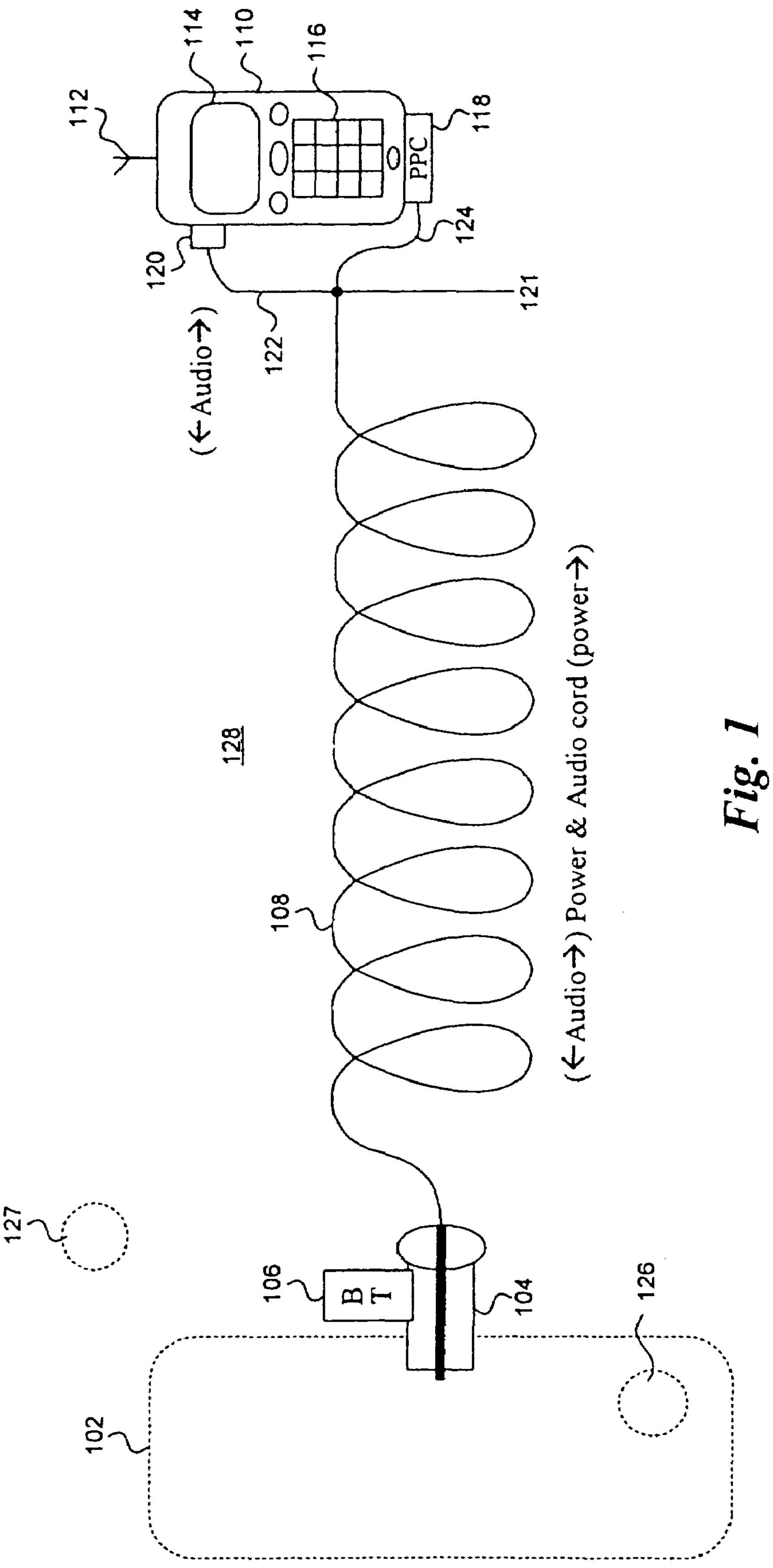
FIG. 1 is a schematic view of a wireless device and a vehicle with a suitable embodiment of a Bluetooth-enabled connection device.

In the drawings, the same reference numbers identify identical or substantially similar elements or acts. To easily identify the discussion of any particular element or act, the most significant digit or digits in a reference number refer to the Figure number in which that element is first introduced (e.g., element 204 is first introduced and discussed with respect to FIG. 2).

Note: the headings provided herein are for convenience and do not necessarily affect the scope or interpretation of the invention.

DETAILED DESCRIPTION

Embodiments of the invention, described below, provide a method and apparatus of adding wireless protocol capability to a charge cord, therefore allowing a wireless device, such as a wireless phone, to acquire wireless protocol capability and electrical power from the same attachment. This provides a significant advantage over prior art systems, where a user would have to purchase a wireless protocol attachment (such as a Bluetooth attachment) that would attach to the phone in addition to the charge cord to receive electrical power from their vehicle. By providing one device that performs multiple functions, costs are reduced and the user experience is improved. Costs are reduced because only one device (e.g., one housing) is needed, and the incremental cost of two or more housings is eliminated. Moreover, the user only has to carry one item instead of multiple items. Another benefit is that the charge cord can function as a normal charge cord when a Bluetooth-enabled device is not present.

In one embodiment, a charge cord includes a vehicle adapter on a first end and a connector on the second end. The vehicle adapter couples the charge cord with the vehicle, such as in a cigarette lighter socket. The connector couples the charge cord with a wireless phone or other wireless device. The charge cord also includes a Bluetooth module, which facilitates communications between the wireless device and the Bluetooth device located in the vehicle. This configuration allows the charge cord with Bluetooth module to provide electrical power and Bluetooth capability to a wireless phone.

The following description provides specific details for a thorough understanding of, and enabling description of, embodiments of the invention. However, one skilled in the art will understand that the invention may be practiced without these details. In other instances, well-known structures and functions have not been shown or described in detail to avoid unnecessarily obscuring the description of the embodiments of the invention.

Depicted embodiments of the present invention are intended for use with any suitable wireless device, such as a wireless phone or wireless web access device. By way of example, the preferred embodiments will be described with reference to a wireless phone 110. One skilled in the art would recognize that other wireless devices are within the scope of the invention, such as a wireless web access telephone, wireless computer access device, Internet-enabled PDA, automobile-based web access device, laptop or palmtop computer, mobile or vehicle-based location-determining device (e.g., Global Positioning System-based device) or other portable or mobile communication devices. The wireless phone 110 may be any phone manufactured by, or substantially compatible with any phone manufactured by, companies such as NOKIA®, ERICSSON®, MOTOROLA®, etc. PDA's may be manufactured by, or substantially compatible with any phone manufactured by, companies such as PALM®, HANDSPRING®, etc., or a PDA using operating systems such as the WINDOWS CE®, PALM®, or other operating systems.

FIG. 1 illustrates a schematic view of a wireless device and a vehicle with a suitable embodiment of a Bluetooth-enabled connection device. A vehicle 102 contains a Bluetooth device 126, such as a hands-free car kit. The vehicle may be any sort of vehicle, such as an automobile, truck, motorcycle, aircraft, boat, two- or four-wheeled vehicle, tractors, scooter, spacecraft, etc. The Bluetooth device 126 may be any device that has Bluetooth capability, such as a hands-free car kit, location-finding device, an automotive audio system such as a stereo, an on-board computer, a navigation system, a head-up display, an authorization system, an identification system, or any suitable device. In a preferred embodiment, the Bluetooth device 126 is located is operably connected to and located within the vehicle 102.

Aspects of the invention are described in detail below with respect to the Bluetooth specification. Bluetooth refers to a specification designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a cell phone) to send data wirelessly, such as exchange e-mail, transmit data to a fax machine, etc. Bluetooth operates using frequency-hopping spread spectrum, where data packets are spread across the 2.45 GHz Spectrum at a rate of 1,600 hops per second to lessen interference. The nominal link range is 10 meters, and the gross data rate is 10 Mbps, although increases may be possible. Bluetooth can support both synchronous connection oriented ("SCO") links for voice and asynchronous connectionless ("ACL") links for packet data. Details on Bluetooth may be found at "Bluetooth Revealed" Miller & Bisdikian, Prentice Hall PTR, 2001, and "Bluetooth Demystified," Muller, McGraw-Hill, 2001, and in particular, "Specification of the Bluetooth System," version 1.1:While aspects of the invention are described herein as employing the Bluetooth protocol, those skilled in the relevant art will recognize that aspects of the invention are equally applicable with other wireless communication protocols and standards, including IEEE 802.11, IEEE 802.11b, HOME RF®, contactless smart cards, IrDA standards, etc.

The wireless phone 110 includes an antenna 112. The antenna 112 allows wireless communication between the wireless phone 112 and a base station, access point or other components of a wireless or cellular network. The wireless phone 110 typically has a display screen 114 and integral user controls 116 which are suitably buttons such as membrane switches.

The connection device 128 provides a connection between the vehicle 102 and the wireless phone 110. In the depicted embodiment, the connection device 128 provides both a power connection and an audio connection between the vehicle 102 and the wireless phone 110. The connection device 128 includes a vehicle adapter 104, a Bluetooth module 106, a main cord 108, an audio cord 122, an audio interface 120, a splitter 121, a power cord 124, and a phone power connector 118. The vehicle adapter 104 provides a connection between the connection device 128 and the vehicle 102. In one embodiment, the vehicle adapter 104 is a cigarette lighter adapter, which is adapted to plug in to the cigarette lighter socket in an automobile or other vehicle so as to receive DC power from the automobile. One skilled in the art would recognize that any connection with a vehicle that provides any type of power (including either AC power or DC power) is within the scope of the invention.

In the embodiment depicted in FIG. 1, the vehicle adapter 104 includes the Bluetooth module 106. The Bluetooth module 106 includes components that allow the module to substantially conform to the Bluetooth specification described above. The Bluetooth module 106 may include a Bluetooth chip or chipset and a Bluetooth radio. In one alternative embodiment, the Bluetooth radio may be located on or within the Bluetooth chip or chipset. The Bluetooth module 106 may use Bluetooth chip sets from manufacturers such as Ericsson or others. The Bluetooth module may also contain circuitry, including a processor, in order to facilitate the exchange of communication signals between the Bluetooth device 126 and the wireless phone 110. For example, the Bluetooth module 106 may include the capability to translate information from the Bluetooth protocol to a format compatible with the wireless phone 110.

The Bluetooth module 106 may employ the Bluetooth Headset profile. The Headset profile uses established networking protocols to enable a device to accept audio input and produce audio output, providing full duplex audio, while providing for authentication and data security. Further details regarding the Headset profile may be found in the Bluetooth protocol noted above.

The vehicle adapter 104 is connected to a main cord 108. The main cord 108 includes components to transmit power from the vehicle adapter 104 to the wireless phone 110 and to transmit audio signals back and forth between the Bluetooth module 106 located in the vehicle adapter and the wireless phone 110. At the splitter 121, the main cord 108 splits into the power cord 124 and the audio cord 122. The power cord 124 provides a power conduit between the splitter 121 (and thus the main cord 108) and the phone power connector 118. The audio cord 122 provides an audio conduit between the splitter 121 (and thus the main cord 108) and the audio interface 120. The audio cord 122 may also provide a conduit for control signals. In one alternative embodiment, the charge cord includes all of the components for connecting the wireless phone 110 with the vehicle adapter 104 in one device, including the splitter 121, the power cord 124, the audio cord 122, the main cord 108, the audio interface 120, the phone power connector 118, etc.

In one alternative embodiment, the audio cord 122 and the power cord 124 provide the connection between the wireless phone 110 and the vehicle adapter 104 without use of a main cord 108. In this embodiment, the audio cord 122 extends from the audio interface 120 to the vehicle adapter 104, and the power cord 124 extends from the phone power connector 118 to the vehicle adapter 104. The audio cord 122 and the power cord 124 may be attached together for most of their length, such as from the vehicle adapter 104 to the splitter 121. The splitter 121 in this embodiment may simply be a plastic reinforcement that prevents the audio cord 122 and the power cord 124 from separating until necessary to connect with the wireless phone 110, such as in cases where the audio interface 120 and the phone power connector 118 are combined in one connector.

The phone power connector 118 provides an interface between the wireless phone 110 and an external power supply. In one preferred embodiment the wireless phone 110 has an internal battery to provide power but can be connected to an external power supply to provide power without using the limited battery life and to provide recharging of the internal battery. In the embodiment depicted in FIG. 1, the phone power connector 118 provides an interface between the power cord 124 and the wireless phone 110 and allows power from the main cord 108, and thus the vehicle 102, to be used to power the wireless phone 110. The audio interface 120 provides an interface between the wireless phone 110 and an external audio source. In the embodiment depicted in FIG. 1, the external audio source is the audio cord 122. When the audio interface 120 is used, the integral speakers and microphone of the wireless phone 110 need not be used and are instead replaced with the audio input and output though the audio interface 120. For example, the audio interface 120 of the Nokia 8260 phone connects with the ear phone and external microphone connections in the phone. Many alternative configurations are possible. The Nokia 51xx, 61xx, and 71xx series phones, for example, provide control and common audio connections for both headset and speakerphone operation through a surface connector on the bottom of the phone, with adjacent power connectors and an antenna connector located near the top of the phone. Other phones 110 provide digital audio connections on the phone base connector. One skilled in the art would recognize that the power connector 118 may be used with any type of wireless device 110.

The embodiment depicted in FIG. 1 allows a user to use the connection device 128 to provide both electrical power for the wireless phone 110 and Bluetooth-capability for wireless communication with the Bluetooth device 126, such as a hands-free car kit. This is an improvement over prior art systems as the functions of a power cord are combined with Bluetooth capability to produce a single, relatively inexpensive device to allow wireless phones 110 without Bluetooth capability to communicate with Bluetooth-enabled hands-free car kits or other Bluetooth devices 126. Therefore, the Bluetooth device 126 and the wireless phone 110 (through the Bluetooth module 106) may exchange digitized information, typically spoken words, to allow for a full-duplex conversation with a remote user via the user's hands-free car kit and their now Bluetooth-enabled wireless phone 110.

In one embodiment, control information may also be transmitted between the wireless phone 110 and the Bluetooth device 126. For example, the Bluetooth device 126 could send control signals to a wireless phone 110 configured to accept such, and the control signals could be sent from a wireless phone 110 to the Bluetooth device 126 (e.g., controlling the volume of the hands-free car kit). Any functionality could be provided that the wireless phone 110 is configured to accept. For example, the functionality could include commands to dial the wireless phone 110, recall number from memory, turn the phone on or off, etc. If the connection device 128 were used with a wireless phone 110 with data capability or a PDA, for example, the connection device 128 and Bluetooth module 106 would translate to using the Serial Port profile under the Bluetooth protocol noted above.

In an alternative embodiment, other information could be transmitted between the wireless phone 110 and the Bluetooth device 126 to provide additional capabilities, such as dial-up networking, facsimile capability, LAN access, generic object exchange (OBEX), synchronization (e.g., of directories and calendars in the phone, etc.), etc. The phone control may be accomplished using the Bluetooth Handsfree profile over the Bluetooth link.

In an alternative embodiment, the connection device 128 is used to facilitate wireless communications between the wireless phone 110 and an independent Bluetooth device 127 that is not part of the vehicle 102. The independent Bluetooth device 127 may be any type of Bluetooth-enabled device, such as a location finding device, PDA, laptop or palmtop computer, headset, electronic device, wireless phone, electronic commerce station, authentication device, identification device, etc.

In another alternative embodiment, the connector 118 is detachable from the connection device 128. In this embodiment, the connector 118 could be easily customized for particular brands of wireless phones 110, for example, and be used with a standard connection device 128. This would allow the connector 118 to be sold by retailers or phone manufacturers separately from the connection device 128. Similarly, the vehicle adapter 104 could also be detachable from the connection device 128, allowing for customized versions of the vehicle adapter 104 to be sold.

In another alternative embodiment, the connection device 128 could contain two or more wireless transceivers. For example, the connection device 128 could contain a Bluetooth module 106, an IEEE 802.11 module, a Home RF module, etc., so that the connection device 128 could facilitate communications using more than one communications protocol.

Unless described otherwise below, the construction and operation of the various blocks shown in FIG. 1 and the other Figures are of conventional design. As a result, such blocks need not be described in further detail beyond that provided herein, because they will be understood by those skilled in the relevant art. Such further detail is omitted for brevity and so as not to obscure the detailed description of the invention. Any modifications necessary to the blocks in FIG. 1 (or other Figures and embodiments) can be readily made by one skilled in the relevant art based on the detailed description provided herein.

Figure 2:
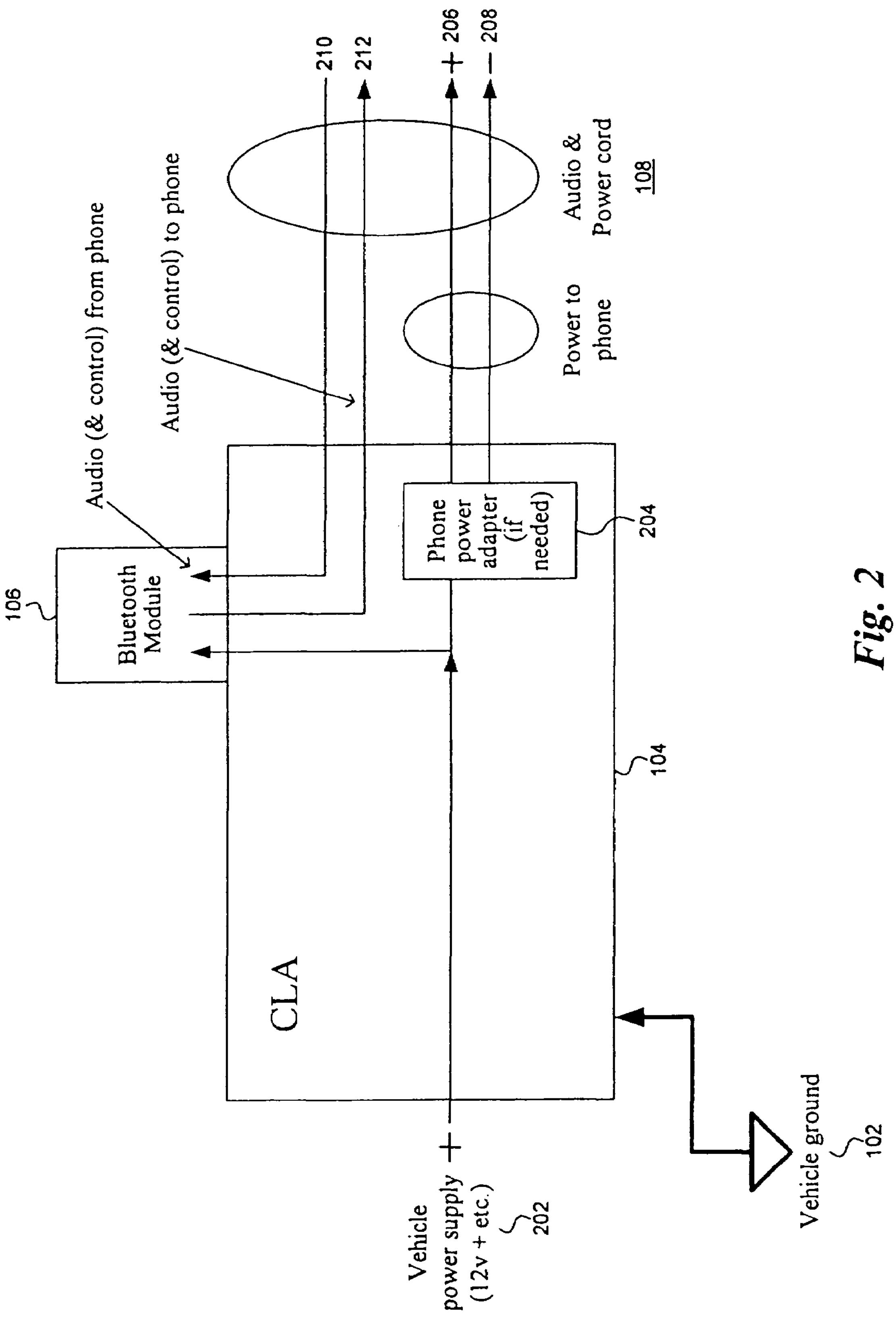
FIG. 2 is a schematic view of a vehicle adapter of a Bluetooth-enabled connection device in a first alternative embodiment.

FIG. 2 is a schematic view of a vehicle adapter of a Bluetooth-enabled connection device in first alternative embodiment. The embodiment of the vehicle adapter 104 depicted in FIG. 2 is a vehicle adapter configured for use with an automobile cigarette lighter, which is also known as a cigarette lighter adapter ("CLA"). The vehicle adapter 104 is connected to a grounded part of the vehicle 102. The vehicle adapter 104 is also connected to a vehicle power supply 202, such as a cigarette lighter that provides DC power at approximately 12 Volts. One skilled in the art would recognize that any type of vehicle power source, including AC or DC power and other voltages, would be within the scope of the invention. The vehicle adapter 104 also optionally contains a phone power adapter 204. The phone power adapter 204 may converts the power from the vehicle power supply 202 to a voltage and form suitable for use by a wireless phone 110. In one embodiment, the phone power adapter 204 is used in conjunction with a phone power connector 118. In another preferred embodiment, the phone power adapter 204 is used with a wireless phone 110 that does not have a phone power connector 118. In the embodiment depicted in FIG. 2, the vehicle adapter 104 includes a Bluetooth module 106, as described above.

The vehicle adapter 104 may include an audio input line 210, an audio output line 212, a positive output line 206, and a negative output line 208. The audio input line 210 receives audio and control input, if it exists, from the wireless phone 110. The audio output line 212, on the other hand, transmits audio and control output to a wireless phone 110. The positive input line 206 and the negative output line 208 provide a positive and negative charge, respectively, to the wireless phone 110 so as to provide electrical power. In one embodiment, a main cord 108 includes the audio input line 210, audio output line 212, positive output line 206, and negative output line 208. In one alternative embodiment, the vehicle adapter 104 does not include the audio input line 210 and the audio output line 212. In another alternative embodiment, an audio cord 122 includes the audio input line 210 and audio output line 212 and a power cord includes the positive output line 206 and negative output line 208. Commands may be sent over the audio lines 210, 212 or may be sent over a separate command line (not shown). A user with a user interface may initiate the commands. In one embodiment, a translator would be necessary between the Bluetooth module 106 and the audio lines 210, 212. Note that the present invention is not limited to electrical communications and other forms of communications, such as optical communications, are also envisioned.

Figure 3:
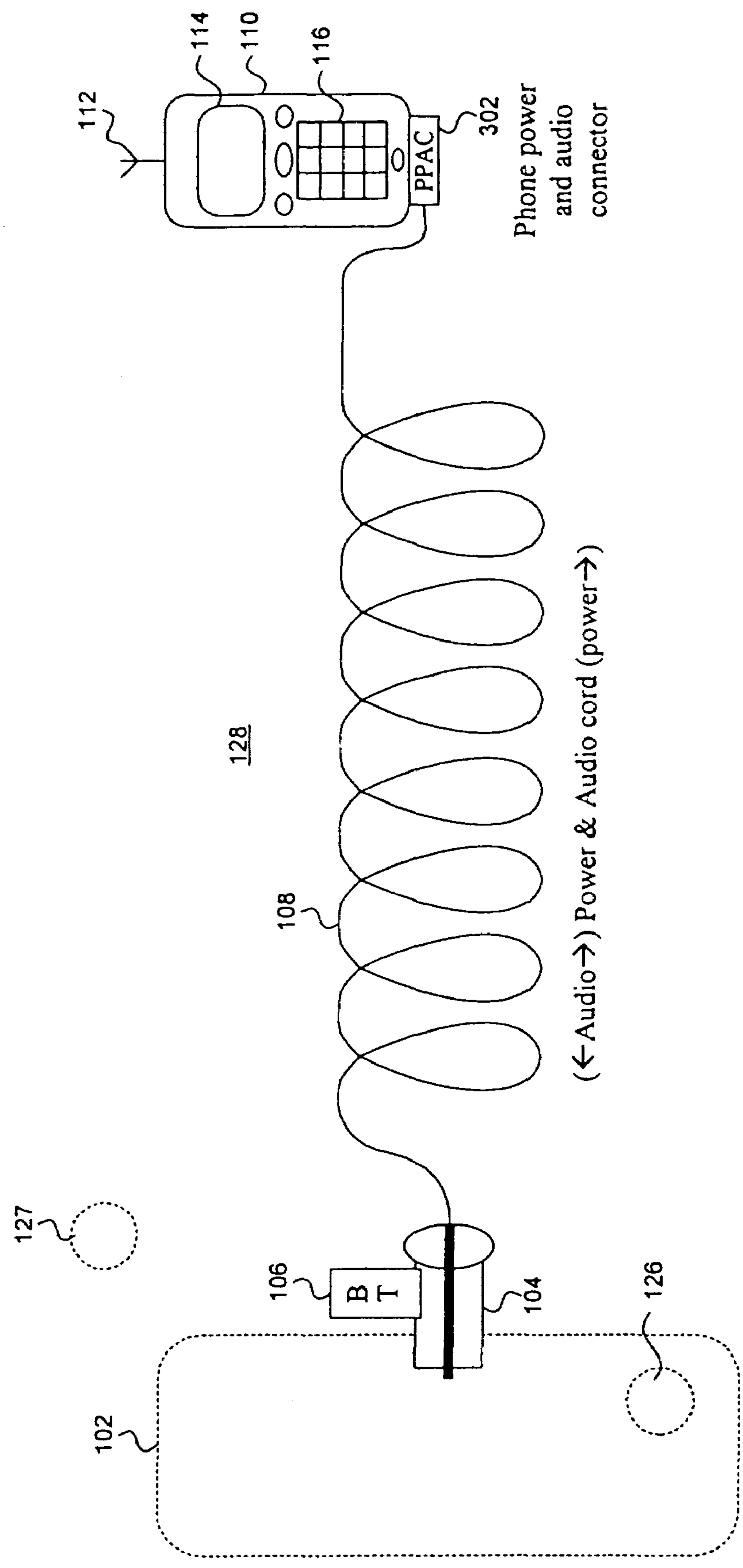
FIG. 3 is a schematic view of a wireless device and a vehicle with a second alternative embodiment of a Bluetooth-enabled connection device.

FIG. 3 is a schematic view of a wireless device 110 and a vehicle 102 with a second alternate embodiment of a Bluetooth-enabled connection device 128. The alternative embodiment of FIG. 3 may be substantially similar to the embodiment described in relation to FIG. 1 except as described below. Indeed, alternatives and alternative embodiments described herein are substantially similar to previously described embodiments, and common elements and functions are identified by the same reference numbers. Only significant differences in construction or operation are described in detail. The connection device 128 operably connects the vehicle 102 (with Bluetooth device 126) and the wireless phone 110. The wireless phone has a phone power and audio connector 302, which provides the combined functionality of the phone power connector 118 and the audio interface 120. In this embodiment, the need for a splitter 121, audio cord 122, and power cord 124 is eliminated, and a main cord 108 can instead be used to provide the complete connection (e.g., the entire charge cord) between the vehicle adapter 104 and the phone power and audio connector 302. The phone power and audio connector 302 may be attached directly to a wireless phone 110, integral to the connection device 128, integral to the wireless phone 110, or attached in another fashion (e.g., a dongle, a separate attachment, etc.) and may be used with any wireless device.

Figure 4:
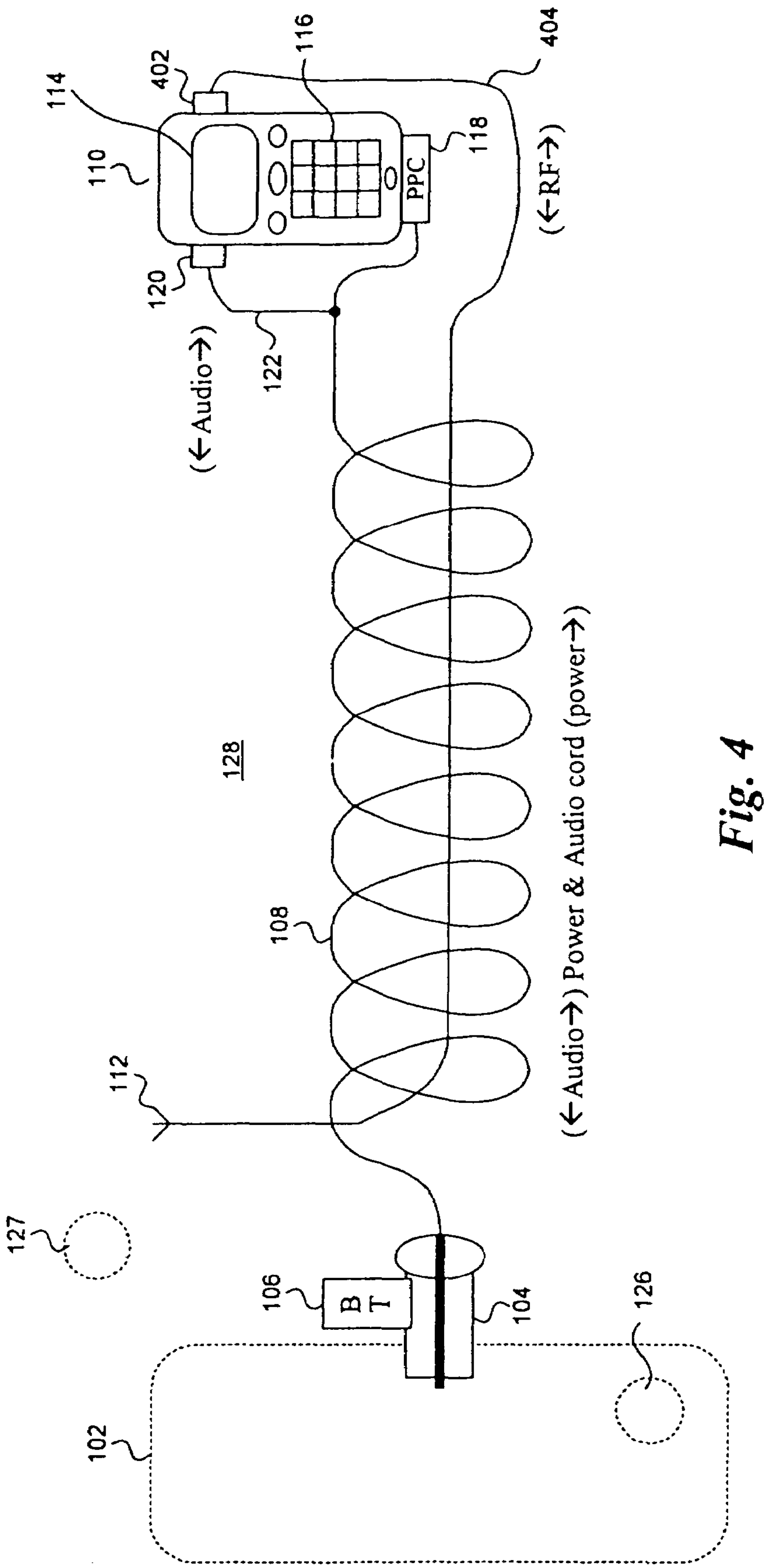
FIG. 4 is a schematic view of a wireless device and a vehicle with a third alternative embodiment of a Bluetooth-enabled connection device.

FIG. 4 is a schematic view of a wireless device 110 and a vehicle 102 with a third alternate embodiment of a Bluetooth-enabled connection device 128. This alternative embodiment is substantially similar to the embodiment disclosed in FIG. 1 except that the antenna 112 is located at the end of an antenna line 404. The antenna line 404 is a RF antenna that effectively extends the length of the antenna 112, providing better reception and communication. In the depicted embodiment, the antenna line 404 extends within a coiled main cord 108. By locating the antenna line 404 within the coiled main cord 108, tangling or damage to the antenna line 404 is minimized. The antenna line 404 is connected to the wireless phone via an antenna interface 402.

Figure 5:
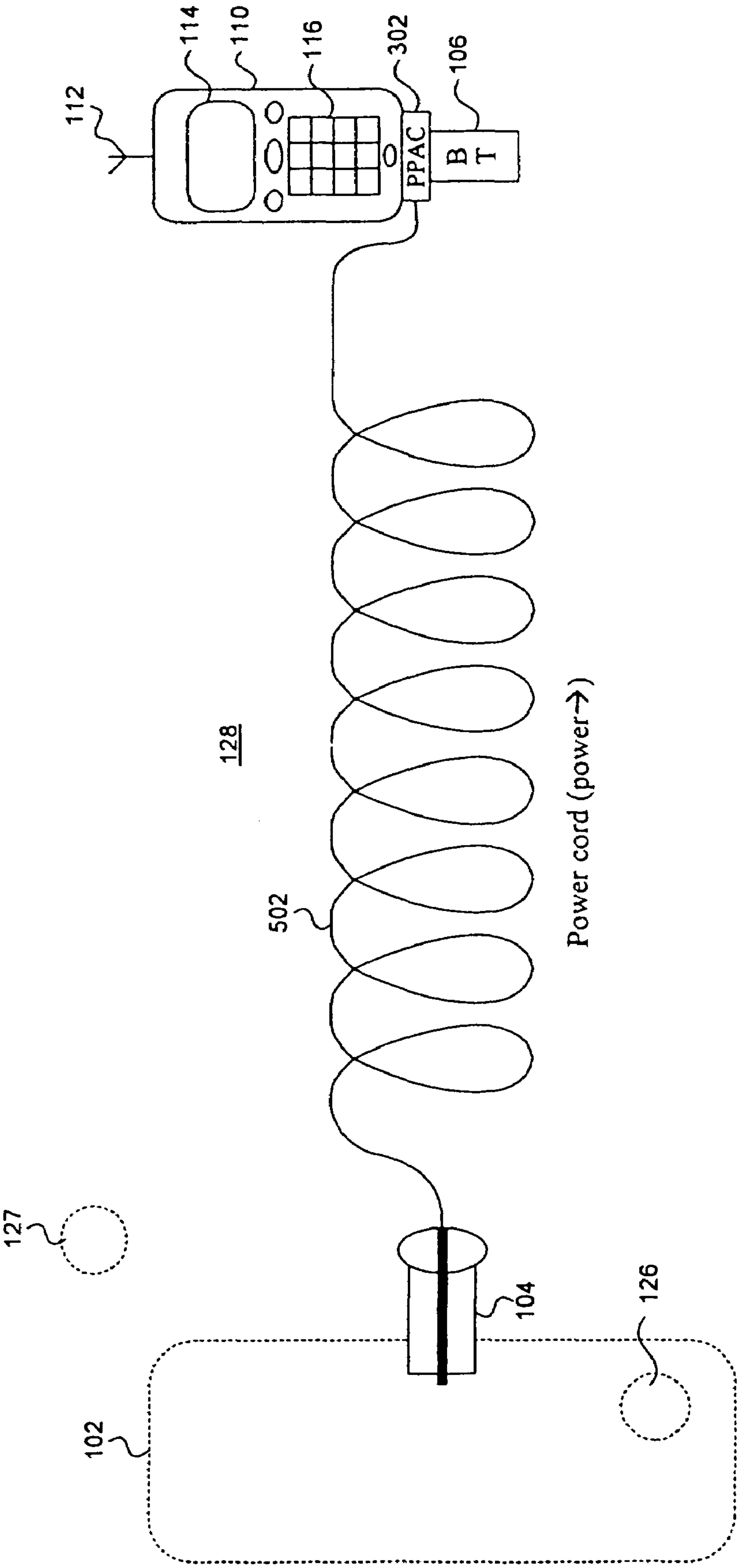
FIG. 5 is a schematic view of a wireless device and a vehicle with a fourth alternative embodiment of a Bluetooth-enabled connection device.

FIG. 5 is a schematic view of a wireless device 110 and a vehicle 102 with a fourth alternate embodiment of a Bluetooth-enabled connection device 128. The alternative embodiment of FIG. 5 may be substantially similar to the embodiment described in relation to FIG. 1 except as described below. A power cord 502 connects the vehicle 102 with the wireless phone. The power cord 502 is connected to the vehicle 102 via a vehicle adapter 104. In the depicted embodiment, the vehicle adapter 104 does not contain a Bluetooth module 106. The wireless phone 110 has a phone power and audio connector 302 to provide an interface for audio, control, and electrical power. A Bluetooth module 106 is included with or near the phone power and audio connector 302 to provide Bluetooth capability for the wireless phone 110. Because the Bluetooth module 106 is located adjacent the wireless phone 110, only a power cord 502 is necessary, as there is no need for transmitting audio and control information from the vehicle adapter 104.

Figure 6:
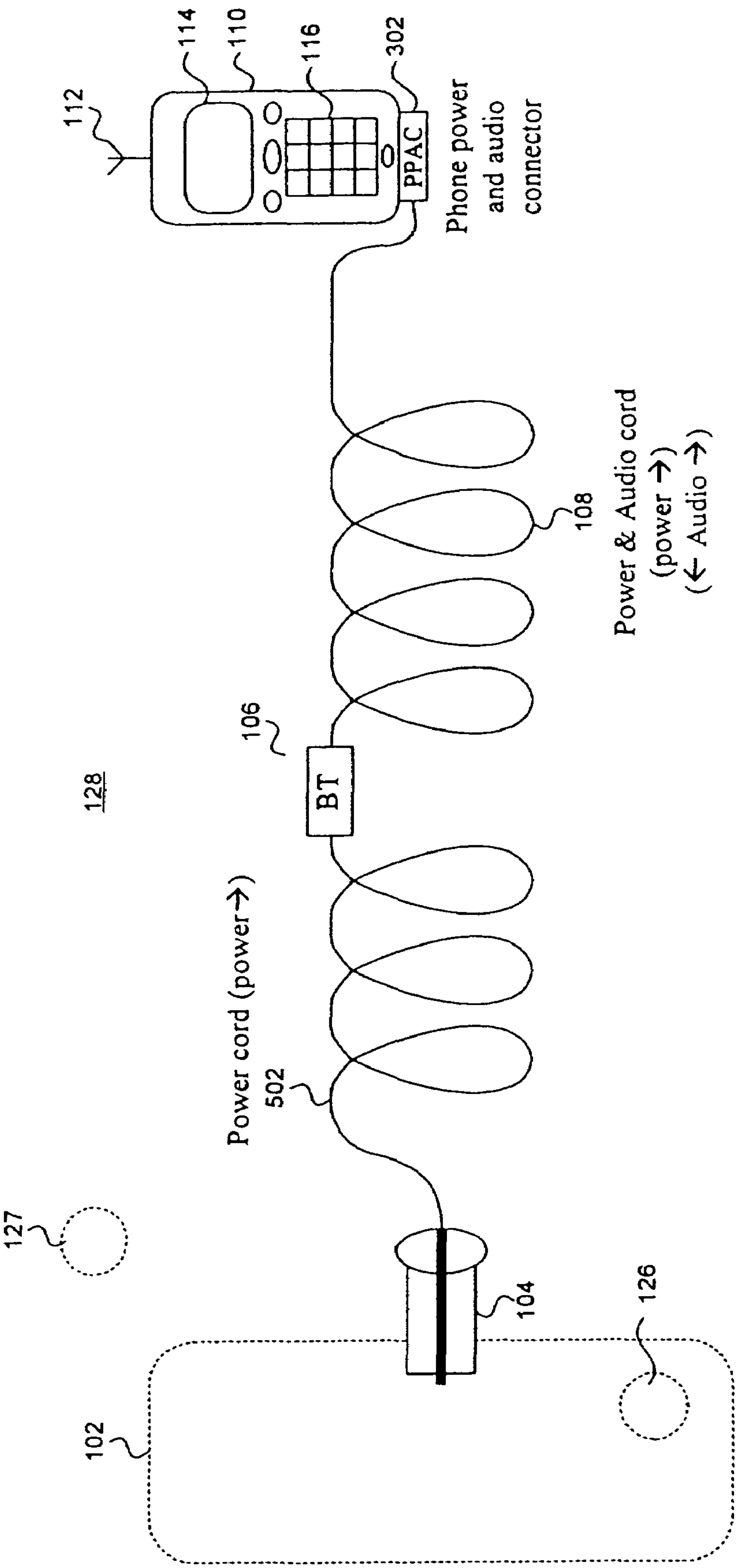
FIG. 6 is a schematic view of a wireless device and a vehicle with a fifth alternative embodiment of a Bluetooth-enabled connection device.

FIG. 6 is a schematic view of a wireless device 110 and a vehicle 102 with a fifth alternate embodiment of a Bluetooth-enabled connection device 128. The alternative embodiment of FIG. 6 may be substantially similar to the embodiment described in relation to FIG. 5 except as described below. In this alternative embodiment, the Bluetooth module 106 is located on the connection device 128 somewhere in between the vehicle adapter 104 and the phone power and audio connector 302. The vehicle adapter 104 and the Bluetooth module 106 are connected via a power cord 502, which is designed to carry electrical power from the vehicle adapter 104 to the Bluetooth module 106. The Bluetooth module 106 and the phone power and audio connector 302 are connected via a power and audio cord 108, which is designed to transmit audio and control signals both directions and to carry electrical power towards the phone power and audio connector 302. The Bluetooth module 106 may be placed anywhere along the length of the connection device 128, with only the configuration and lengths of the power cord 502 and the power and audio card 108 needing to be modified accordingly. In an alternative embodiment, the Bluetooth module 106 is located inside one of the cords or inside of the connection device 128.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer," as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, shall refer to this application as a whole and not to any particular portions of this application. Use of the term "or," as used in this application with respect to a list of two or more items, shall be interpreted to cover any, all, or any combination of items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein may be applied to other systems, not necessarily the system described herein. The various embodiments described herein can be combined to provide further embodiments. These and other changes can be made to the invention in light of the detailed description.

Incorporated by reference herein are all above references, patents, or applications and the following U.S. patent applications, which are assigned to the assignee of this application: patent application Ser. No. 10/036,151, entitled, "System and Method for Providing an Adapter Module," filed Dec. 31, 2001 and patent application Ser. No. 10/036,109, entitled, "System and Method for Providing an Adapter Module," filed Dec. 31, 2001. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a method, other aspects may likewise be embodied in a method or process. Accordingly, the inventors reserve the right to add additional claims after filing the application to pursue such additional claim forms for other aspects of the invention.

We claim:

1. A method for coupling a vehicle having a wireless protocol-enabled device and a power supply to a wireless device, the method comprising:

coupling with the vehicle power supply by way of a cigarette lighter adapter or vehicle accessory outlet;

connecting with the wireless device;

providing a conduit for power between the vehicle power supply and the wireless device;

transmitting audio information using the wireless protocol to the wireless protocol-enabled device;

receiving audio information using the wireless protocol from the wireless protocol-enabled device; and communicating the audio information to and from the wireless device.

2. The method of claim 1 wherein the wireless protocol is Bluetooth.

3. The method of claim 1 further comprising translating the audio information to and from the wireless protocol to a form compatible with the wireless device.

4. The method of claim 1 wherein the wireless device is a wireless phone.

5. The method of claim 1 wherein the wireless protocol-enabled device is a hands-free car kit.

6. The method of claim 1 further comprising wirelessly exchanging signals under a Bluetooth protocol with the wireless protocol-enabled device.

7. A method for manufacturing a connection device, comprising:

integrating a wireless protocol module into a charge cord, wherein the charge cord is adapted to deliver electrical power to a wireless device from a vehicle power supply, and wherein the wireless protocol module is configured to transmit and receive packetized data under the wireless protocol; and at least partially enclosing the wireless protocol module in a housing.

8. An apparatus for coupling a mobile device to a power supply and a wireless protocol enabled device, comprising:

a charge cord having a first end and a second end, the charge cord for providing power from the power supply to the mobile device;

a power adapter located at the first end of the charge cord, the power adapter for coupling the power supply to the charge cord;

a connector coupled to the second end of the charge cord, the connector for coupling the charge cord to the mobile device; and a wireless protocol module coupled to the charge cord, the wireless protocol module for wirelessly coupling the mobile device to the wireless protocol enabled device, wherein the wireless protocol module is configured to transmit and receive packetized data under the wireless protocol;

wherein the charge cord also provides power to the wireless protocol module.

9. The apparatus of claim 8, wherein the wireless protocol is selected from Bluetooth, the IEEE 802.11, and HomeRF.

10. The apparatus of claim 8, wherein the mobile device is a cellular telephone.

11. The apparatus of claim 8, wherein the wireless protocol enabled device is a vehicle hands-free kit capable of communicating via the wireless protocol.

12. The apparatus of claim 8, wherein the wireless protocol enabled device is a headset capable of communicating via the wireless protocol.

13. The apparatus of claim 8, wherein the charge cord conveys at least one of data and voice from the connector coupled with the mobile device to the wireless protocol module.

14. The apparatus of claim 8, wherein the power adapter is a vehicle cigarette lighter adapter.

* * * * *